United States Patent
Wood et al.

(10) Patent No.: US 7,661,770 B2
(45) Date of Patent: Feb. 16, 2010

(54) PNEUMATIC EMERGENCY BRAKE ASSURANCE MODULE

(75) Inventors: James A. Wood, Spartanburg, SC (US); Robert N. Scharpf, Greer, SC (US); David E. Schweikert, Duncan, SC (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 12/160,247

(22) PCT Filed: Aug. 16, 2006

(86) PCT No.: PCT/US2006/031844

§ 371 (c)(1),
(2), (4) Date: Jul. 8, 2008

(87) PCT Pub. No.: WO2007/037818

PCT Pub. Date: Apr. 5, 2007

(65) Prior Publication Data

US 2009/0057072 A1 Mar. 5, 2009

Related U.S. Application Data

(60) Provisional application No. 60/717,973, filed on Sep. 16, 2005.

(51) Int. Cl.
*B60T 8/34* (2006.01)
(52) U.S. Cl. .................. 303/128; 303/127; 303/22.6
(58) Field of Classification Search .............. 303/3, 303/7, 9.61, 9.69, 22.6, 127, 128
See application file for complete search history.

(56) References Cited

U.S. PATENT DOCUMENTS

| | | | |
|---|---|---|---|
| 5,662,391 A | 9/1997 | McKay | |
| 5,735,579 A | 4/1998 | Wood et al. | |
| 5,788,339 A | 8/1998 | Wood et al. | |
| 5,934,765 A | 8/1999 | Hart | |
| 5,961,564 A | 10/1999 | Wood et al. | |
| 5,967,620 A | 10/1999 | Truglio et al. | |
| 6,095,621 A * | 8/2000 | Wood et al. | 303/22.6 |
| 6,318,813 B1 | 11/2001 | Goodell | |
| 6,457,782 B1 | 10/2002 | Truglio et al. | |
| 6,520,599 B2 * | 2/2003 | Wood et al. | 303/22.4 |
| 6,702,400 B1 | 3/2004 | Eberling | |
| 6,746,087 B1 | 6/2004 | Reynolds et al. | |
| 7,520,574 B2 * | 4/2009 | Schweikert et al. | 303/128 |
| 2002/0163248 A1 * | 11/2002 | Wood et al. | 303/128 |

FOREIGN PATENT DOCUMENTS

WO 9809857 A1 3/1998

* cited by examiner

*Primary Examiner*—Christopher P Schwartz
(74) *Attorney, Agent, or Firm*—The Webb Law Firm, P.C.

(57) ABSTRACT

A pneumatic emergency brake assurance module comprises a high capacity transfer valve connected in a first position to the output of the variable load relay valve and in a second position connected to a source of emergency braking air pressure. A timing reservoir is in communication with the pilot port of the high capacity transfer valve. A check valve/choke circuit provides parallel connections between a double check valve and the output of the variable load relay valve such that flow from the variable load relay valve passes through a charging choke and opposite flow to the variable load relay valves passes through a dissipation choke.

3 Claims, 2 Drawing Sheets

PNEUMATIC EMERGENCY BRAKE ASSURANCE MODULE

BACKGROUND OF THE INVENTION

1. Field of the Invention

It is well known in the brake control art that modern train brake control systems typically use a central controller unit to control the brakes of the rail vehicles that comprise the train. A train operator located in the lead locomotive manipulates the brake handles or like devices of the train to apply and release the brakes of the trucks or bogies on each rail vehicle as desired. The inputs from the brake handles are typically processed by a cab control unit and passed to the central controller unit. In response to these and other inputs, the central controller unit issues a brake command signal along a train line to each of the rail vehicles in the form of either a pneumatic signal or an electrical signal or even both. Brake equipment on each of the rail vehicles applies or releases the brakes according to the dictates of the particular brake command signal received. The central controller unit sends the brake command signal to each of the rail vehicles along either a pneumatic train line or an electrical train line.

2. Description of Related Art

Depending on the type of train being considered, the brake equipment on each rail vehicle may include either exclusively pneumatic equipment or a combination of electrical and pneumatic (i.e., electro-pneumatic) equipment. In those trains featuring electro-pneumatic brake equipment on the rail vehicles, each rail vehicle typically includes a local control system whose construction and operation are generally well known in the brake control art. The local control system on each rail vehicle receives the brake command signal and various other signals in response to which it directly controls the electro-pneumatic equipment according to principles well known in the brake control art. Specifically, the local control system generates the electrical signals which open or close the various valves which supply pressure to or vent pressure from the brake cylinders. The brakes on each rail vehicle apply and release accordingly.

The prior art brake control systems discussed in the foregoing paragraphs typically provide service braking, emergency braking, and wheel slip control functions. The local control system includes a microprocessor-based device which performs service brake control, limited emergency brake control, and wheel slip control. Associated with the brakes on each bogie is a Brake Cylinder Control Unit (BCCU) which manipulates brake cylinder pressure based on pneumatic and/or electric inputs from the local control unit. It provides service and emergency brake cylinder pressure control as well as wheel slip brake cylinder pressure modulation. The BCCU has integrated magnet valves and transducers which are monitored and controlled by the local control unit. The primary functional element of the BCCU is a Variable Load Relay Valve (VLRV) that provides a controlled pneumatic pressure to the brake cylinders. The output of the VLRV is a function of the pressure at its pilot pressure control port and an input indicative of vehicle load. The pilot pressure commands brake cylinder pressures during service braking. The pressures are related, for example, to speed and vehicle weight. In an emergency, the pilot pressure port of the VLRV is controlled for emergency stopping which may include modulation of brake cylinder pressure to minimize wheel slipping. Typically, the source of pilot pressure commands for service braking and emergency braking are different and are selected by an Emergency Magnet Valve (EMV) controlled by the local control system.

Prior to this invention, the reduction of emergency brake pressure during wheel slip was either inhibited (prevented) or monitored by a hardware electronic safety timer. See U.S. Pat. No. 5,735,579 entitled "Brake Assurance Module." Depending on the configuration of the pneumatic brake components and wheel slip control components, often the use of an electronic hardware safety timer is insufficient for protecting against extended periods of brake reductions without sufficient periods of brake application. Inhibiting wheel slip control often results in wheel slides and wheel lockups with extended stopping distances. With increasing demand for wheel protection in all brake modes along with increased emphasis on system safety, the pneumatic brake assurance module according to this invention becomes necessary, and easy to configure and analyze. Moreover, the pneumatic brake assurance module according to this invention will:

1. assure that emergency brake is applied;
2. provide a known reliability analysis of the emergency brake modes;
3. provide a means to allow wheel slip protection of the emergency brake for fixed limited periods of time;
4. provide a non-electronic method to force emergency braking to the required level; and
5. allow software-controlled blending and wheel slip control of emergency brake modes.

SUMMARY OF THE INVENTION

Briefly, according to this invention, there is provided an improvement in a pneumatic brake cylinder control circuit for controlling the supply of pressurized air to brake cylinders. The circuit has a main source of pressurized air and a connection to a brake pipe, the pressure in which drops in an emergency. The main source of pressurized air and the brake pipe may be the same. A variable load relay valve supplies the brake cylinders with the appropriate braking pressure. The variable load relay valve is controlled by pilot pressure from either a service braking control source or an emergency braking control source selected by an emergency magnet valve and an input indicative of load.

The improvement according to this invention comprises a pneumatic emergency brake assurance module which includes a high capacity transfer valve connected in a first position to the output of the variable load relay valve and in a second position to a source of emergency braking air pressure. The high capacity transfer valve is biased in the second position to provide communication between the emergency braking air pressure source (emergency reservoir) and the brake cylinders. The high capacity transfer valve is forced to the first position by pressure exceeding a preset pilot pressure at the pilot pressure port.

Pressure at the pilot pressure port of the high capacity transfer valve is controlled by a transfer valve pilot pressure circuit comprising a timing reservoir, a double check valve, and check valve/choke circuit. The timing reservoir is in communication with the pilot port of the high capacity transfer valve. The double check valve has an output port in communication with the timing reservoir and pilot port. The double check valve has one input connected to the emergency braking control source (brake pipe) and the other input connected through a check valve/choke circuit to the output of the variable load relay valve. Thus, the output of the double check valve will be in communication with the input port having the higher pressure. The check valve/choke circuit provides parallel connections between the double check valve and the output of the variable load relay valve such that flow from the variable load relay valve passes through a charging choke and opposite flow to the variable load relay valve passes through a dissipation choke. Thus, if either input to the double check valve has a pressure exceeding the pilot pressure required to overcome the bias of the high capacity transfer valve, it will maintain the communication between the variable load relay valve and the brake cylinders, but if the pressure of both inputs to the double check valve falls below the pilot pressure required to overcome the bias, after a period of time for the timing reservoir to discharge through the check valve/choke circuit to that pressure level, the high capacity transfer valve will place the source of emergency braking air pressure (e.g., emergency reservoir) in communication with the brake cylinders.

According to a preferred embodiment, the check valve/choke circuit has a check valve in series with the charging choke and the charging choke has a greater capacity than the dissipation choke.

According to a preferred embodiment, the preset pilot pressure and corresponding bias for the high capacity transfer valve and the volume of the timing reservoir are selected to provide a delay of at least one second before the high capacity transfer valve connects the source of emergency braking air pressure.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
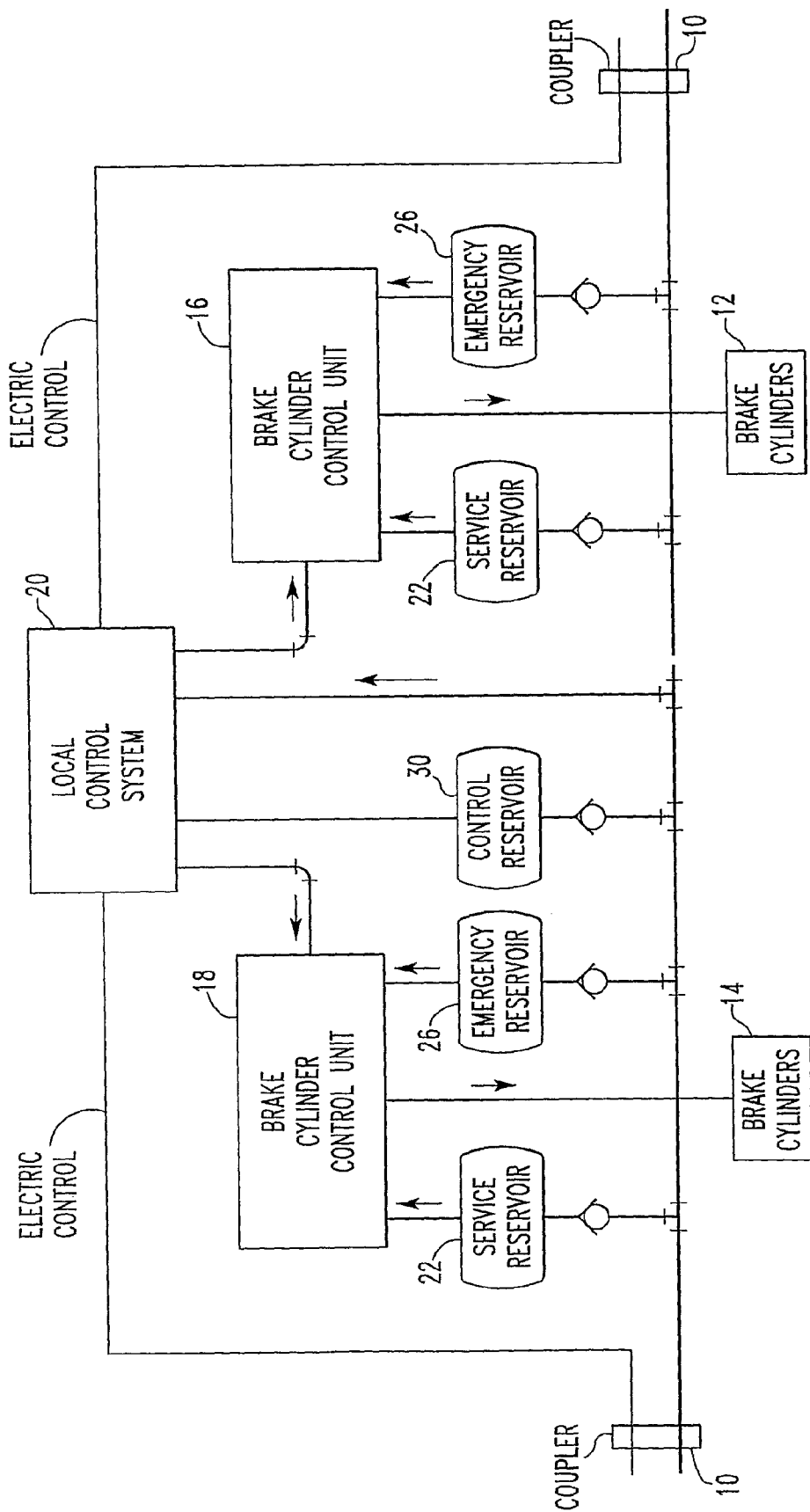
FIG. 1 is a much simplified schematic of an exemplary braking system on a transit vehicle in which the improvement of this invention can be implemented.

Referring now to FIG. 1, the transit vehicle has a coupler 10 at each end that mechanically couples adjacent vehicles and provides coupling of the brake pipe and electrical train lines. The brake pipe may be a source of pneumatic pressure for implementing braking. It is used to provide pneumatically transferred signals to the braking systems along the train. The brake pipe, along with the electric train line, implements the combined electrical and pneumatic (electro-pneumatic) braking control.

As shown in FIG. 1, the transit vehicle has two sets of brake cylinders 12, 14, one for each bogie, for actuating brakes, such as disc brakes, associated with each wheel axle. Each set of brake cylinders is controlled by a Brake Cylinder Control Unit (BCCU) 16, 18. The BCCUs respond to service braking commands and emergency braking commands generated by a local control system 20 which, in some implementations, are functions of a friction brake control unit and a brake pipe control unit as are known in the art. The local control system 20 responds to electric and pneumatic signals passed along the train line from a central controller unit in the lead locomotive, for example. As shown in FIG. 1, a number of local reservoirs is charged by a brake pipe 32.

in an alternate configuration, a main reservoir pipe runs parallel to the brake pipe. Various reservoirs, service reservoir 22, emergency reservoir 26, and control reservoir 30, are charged from the main reservoir pipe. In that event, the brake pipe still communicates the emergency stopping signal. The discussion of FIG. 1 is for providing background in which the invention disclosed may function and is not intended to restrict the scope of the invention.

Figure 2:
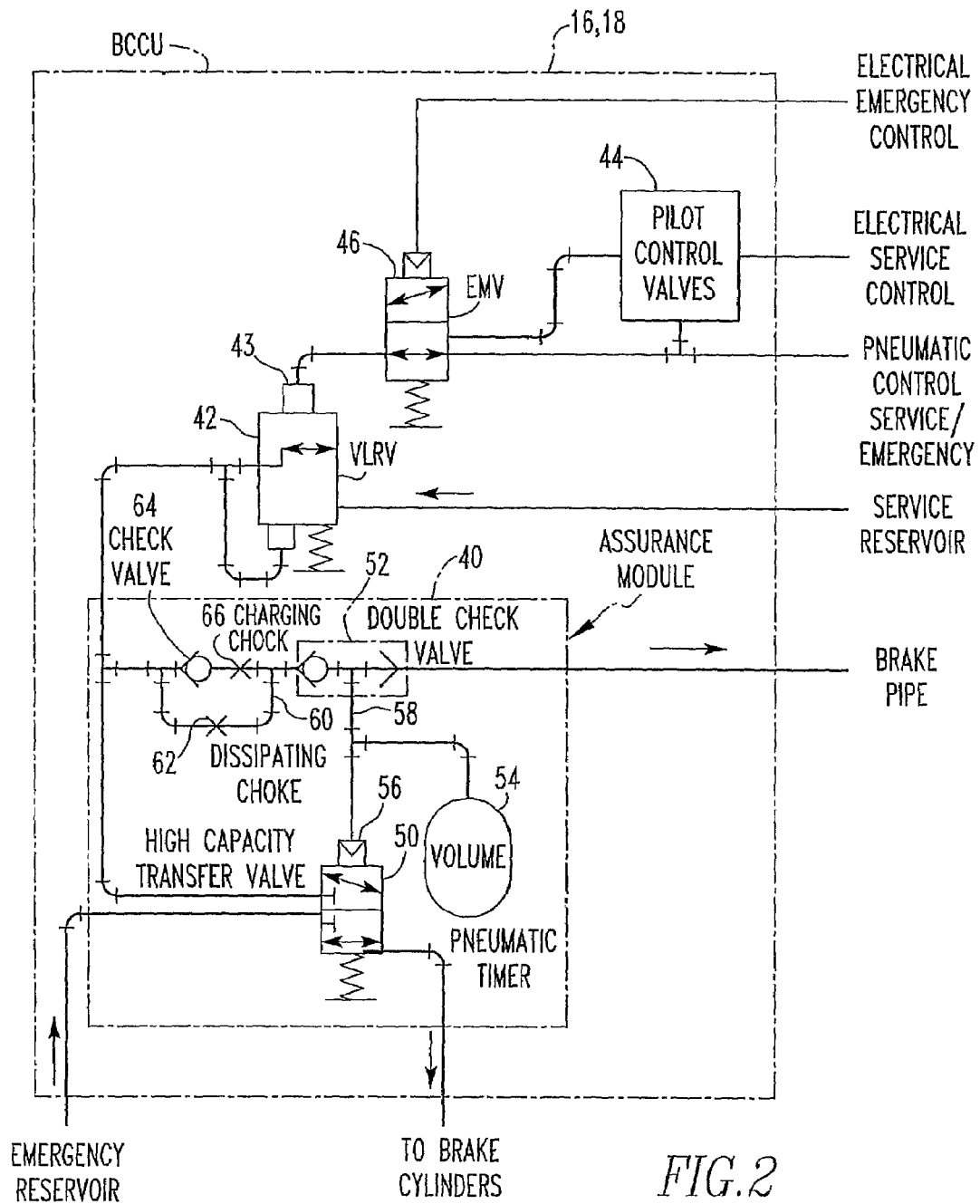
FIG. 2 is a schematic diagram of a brake cylinder control circuit in which a pneumatic emergency brake assurance module according to one embodiment of this invention has been implemented.

Referring now to FIG. 2, there is shown one example of a BCCU having a pneumatic emergency brake assurance module 40. Central to the BCCU is a variable load relay valve (VLRV) 42, the primary function of which is to provide electro-pneumatic friction service brake control, emergency brake control, and wheel slip control for its respective bogie. The variable pressure output of the VLRV 42 is controlled by a pilot pressure at its pilot pressure port 43. Under normal operating conditions, the pilot pressure is provided by pilot control valves 44 in response to electrical service control signals from the local control system. The pilot control valves are also used to implement wheel slip control. The emergency and backup pneumatic controlled service braking are controlled by pneumatic control signals generated by the local control system when an Emergency Magnet Valve (EMV) 46 is shifted by an electrical signal.

While it is not expected that in any control mode, including emergency braking or wheel slip controlled braking, that the pilot pressure at the VLRV 42 for emergency stopping would not apply braking pressure to the braking cylinders, the emergency brake assurance module is implemented according to this invention as a fail-safe system. The primary objective of the invention is to provide an independent method to ensure that emergency pressure is available. This module is pneumatically designed with components of known reliability and simple modes of operation for analysis requirements. The use of a pneumatic assurance module provides independence from electronic software-controlled pressure devices that are required to meet adaptive wheel slip control specifications. This invention ensures that emergency brake cylinder pressure is applied while allowing both dynamic brake blending and wheel slip control during the emergency brake condition. The time period in which the modulation of the available brake cylinder pressure is allowed after the initiation of emergency braking is controlled. Additionally, this module assures that emergency brake pressure is applied when brake control pressure is released (either intentionally or unintentionally) for an extended period of time during the emergency brake condition.

A High Capacity Transfer Valve (HCTV) 50 determines whether the emergency brake output will come from the emergency reservoir (in some systems indirectly via an emergency unit) or the VLRV 42. The HCTV 50 is biased in the position to provide emergency brake output from the emergency reservoir. The valve implements the command to implement emergency brake assurance control.

The brake pipe is connected to one input of a double check valve 52. An outlet port 58 is connected to a timing reservoir 54 and a pilot port 56 of the HCTV 50. Thus, the timing reservoir will normally be filled to the pressure of the brake pipe, and the brake pipe pressure being more than that needed to overcome the bias on the HCTV 50, the VLRV 42 will be in control of brake cylinder pressure. In an emergency situation when the brake pipe pressure drops, the pressure in the reservoir and on the pilot port of the HCTV 50 will equalize with the output of the VLRV 42 through a check valve/choke circuit 60 connected to the other input port of the double check valve. Even if the output of the VLRV 42 is at atmospheric pressure, the pressure on the pilot port of the HCTV 50 will remain sufficiently high to hold the valve in the normal operating position connected to the VLRV 42 until the reservoir discharges to a pressure below that required to overcome the bias. This provides a timing or delay function that is dependent on the size of a dissipation choke 62, the volume of the timing reservoir 54, the average pressure at the output of the VLRV 42, and the minimum pilot pressure to overcome the bias on the HCTV 50.

The check valve/choke circuit 60 is provided with two parallel paths. The dissipation choke 62 is on one path. In the other path is a check valve 64 permitting flow from the VLRV to the charging volume and a charging choke 66. Thus, during wheel slip control, the timing reservoir can be recharged during the period when the brake cylinder pressure is raised between periods when the brake cylinder pressure is reduced. Hence, normal wheel slip control will not result in the bias on the HCTV being overcome. The charging choke 66 adjusts the charging flow rate which determines how the pneumatic timer is reset based on the rate of air flowing back into the timing reservoir 54. The timing reservoir volume, charging choke 66 size, dissipation choke 62 size, and brake pressure bias of the HCTV 50 are selected (configured) to meet the desired requirements based on the emergency brake analysis. These values selected determine the time in brake release allowed, the amount (level) of brake pressure reduction allowed, and the rate at which the timer is reset when brake pressure is applied.

The pneumatic timer will begin timing as soon as the emergency condition is initiated by the loss of brake pipe pressure and if the control pressure is not sufficient. The timer can be reset whenever the brake control pressure becomes available (not released) or whenever the brake pipe pressure becomes available (not in emergency brake condition). The timer will timeout when brake pressure is released for an extended period of time regardless of the control methodology of the brake pressure once the emergency condition is initiated.

As illustrated in FIG. 2, the modulated brake control pressure (output of the VLRV) and emergency level brake pressure can be derived from the same source or from independent reservoirs wherein the emergency brake pressure is completely separate from the modulated pressure. Where the source is the same, the control pressure would be split so that one branch is controlled by the brake/wheel slip module and the other is directly connected to the HCTV 50.

By way of example only, the range of certain parameters of the preferred embodiment of the pneumatic brake assurance module is set forth in the following table.

TABLE

| Parameter | Maximum | Minimum |
| --- | --- | --- |
| Brake Cylinder Pressure | 67 psig | 55 psig |
|  | $462 \times 10^4$ pascal | $379 \times 10^4$ pascal |
| Emergency Brake Pipe Pressure | 0 psig | 0 psig |
| Reservoir Volume | 90 in$^3$ | 90 in$^3$ |
|  | $1.47 \times 10^{-3}$ m$^3$ | $1.47 \times 10^{-3}$ m$^3$ |
| Charging Choke Size | 0.160 in | 0.160 in |
|  | $4.064 \times 10^{-3}$ m | $4.064 \times 10^{-3}$ m |
| Dissipation Choke Size | 0.060 in | 0.060 in |
|  | $1.52 \times 10^{-3}$ m | $1.52 \times 10^{-3}$ m |
| Pilot Pressure to overcome bias on HCTV | 25 psig | 25 psig |
|  | $172 \times 10^4$ pascal | $172 \times 10^4$ pascal |
| Delay Provided when both input to Double Check Valves are atmospheric | 3.46 sec | 2.7 sec |
| Time to fully recharge Reservoir Volume | 0.40 sec | 0.36 sec |

Having thus described our invention in the detail and particularity required by the Patent Laws, what is desired protected by Letters Patent is set forth in the following claims.

The invention claimed is:

1. In a pneumatic brake cylinder control circuit for controlling the supply of pressurized air to brake cylinders, said circuit having a source of pressurized air which drops in an emergency and having a variable load relay valve, the output of which is supplied to the brake cylinders, said variable load relay valve being controlled by an input indicative of vehicle load and a pilot pressure from either a service braking control source or an emergency braking control source selected by an emergency magnet valve, the improvement comprising:

a pneumatic emergency brake assurance module comprising:

a high capacity transfer valve connected in a first position to the output of the variable load relay valve and in a second position connected to a source of emergency braking air pressure, the high capacity transfer valve being biased in the second position to provide communication between the emergency braking air pressure and the brake cylinders, the high capacity transfer valve being forced to the first position by a preset pilot pressure at the pilot port; and a transfer valve pilot pressure circuit comprising:

a timing reservoir in communication with the pilot port of the high capacity transfer valve; and a double check valve having an output port in communication with the reservoir and pilot port of the high capacity transfer valve, the double check valve having one input connected to said source of pressurized air, the double check valve having the other input connected through a check valve and choke circuit to the output of the variable load relay valve, such that the output of the double check valve will be in communication with the input port thereof having the higher pressure, said check valve and choke circuit providing parallel connections between the double check valve and the output of the variable load relay valve such that flow from the variable load relay valve passes through a charging choke and opposite flow to the variable load relay valve passes through a dissipation choke, whereby if either input to the double check valve has a pressure exceeding the pilot pressure required to overcome the bias of the high capacity transfer valve it will maintain the communication between the variable load relay valve and the brake cylinders and if the pressure of both inputs to the double check valve falls below the pilot pressure required to overcome the bias after a period of time for the reservoir to discharge through the check valve/choke circuit to that pressure level, the high capacity transfer valve will place the source of emergency braking air pressure in communication with the brake cylinders.

2. The improvement of claim 1, wherein the check valve and choke circuit has a check valve in series with the charging choke and the charging choke having a greater capacity than the dissipation choke.

3. The improvement of claim 1, wherein the preset pilot pressure and corresponding bias for the high capacity transfer valve and the volume of the reservoir are selected to provide a delay of at least one second before the high capacity transfer valve connects the source of emergency braking air pressure.

* * * * *

UNITED STATES PATENT AND TRADEMARK OFFICE
CERTIFICATE OF CORRECTION

PATENT NO. : 7,661,770 B2
APPLICATION NO. : 12/160247
DATED : February 16, 2010
INVENTOR(S) : Wood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 23 days.

Signed and Sealed this

Thirtieth Day of November, 2010

David J. Kappos
*Director of the United States Patent and Trademark Office*